United States Patent
Yahav et al.

[11] Patent Number: 6,100,517
[45] Date of Patent: Aug. 8, 2000

[54] THREE DIMENSIONAL CAMERA

[75] Inventors: Giora Yahav; Gavriel Iddan, both of Haifa, Israel

[73] Assignee: 3DV Systems Ltd., Yokneam, Israel

[21] Appl. No.: 08/981,358

[22] PCT Filed: Jun. 20, 1996

[86] PCT No.: PCT/IL96/00025

§ 371 Date: Dec. 19, 1997

§ 102(e) Date: Dec. 19, 1997

[87] PCT Pub. No.: WO97/01113

PCT Pub. Date: Jan. 9, 1997

[30] Foreign Application Priority Data

Jun. 22, 1995 [IL] Israel ......................................... 114278

[51] Int. Cl.$^7$ ....................................................... H01J 27/00
[52] U.S. Cl. ................................ 250/208.1; 250/559.38; 356/5.01; 348/138
[58] Field of Search .......................... 250/208.1, 559.38, 250/559.31; 356/5.01, 5.07, 5.08, 141.5, 375, 376; 348/46, 50, 135, 138, 140, 370

[56] References Cited

U.S. PATENT DOCUMENTS 3,571,493 3/1971 Baker et al. .
3,629,796 12/1971 Brownscombe et al. .
3,734,625 5/1973 Aagard .

(List continued on next page.)

FOREIGN PATENT DOCUMENTS

0465806 A2 1/1992 European Pat. Off. .

OTHER PUBLICATIONS

Garcia et al; Characterization of a Scannerless LADAR System; SPIE vol. 1936, pp23–30; 1993.

Anthes et al; Non–scanned LADAR imaging and applications; SPIE vol. 1936, pp11–22, (1993).

Hill et al; A Multi–Detecting Rangefinder Capable of Range Imaging; Applied Optics and Optoelectronics, University of York, Abstract Book, pp. 208–210; Sep. 1994.

Muguira et al; Scannerless Range Imaging with a Square Wave; SPIE vol. 2472, pp. 106–113; Conference date: Apr. 1995.

Strand; Underwater Electro–optical System for Mine Identification; pp. 6–238 thru 6–247; Proceedings of the Autonomous Vehicles in Mine Countermeasures Symposium, Apr., 1995.

Swartz; Diver and ROV Deployable Laser Range Gate Underwater Imaging Systems; Unerwater Intervention 93 Conference Proceedings, pp. 193–199; 1993.

(List continued on next page.)

*Primary Examiner*—Que T. Le
*Assistant Examiner*—Kevin Pyo
*Attorney, Agent, or Firm*—Fenster & Company Patent Attorneys, Ltd.

[57] ABSTRACT

Apparatus for creating an image indicating distances to points in objects in a scene, comprising:

a modulated source of radiation, having a first modulation function, which directs radiation toward a scene such that a portion of the modulated radiation is reflected from the points and reaches the apparatus;

an array detector which detects radiation from the scene, modulated by a second modulation function, each element of the array detector being associated with a point in the scene, each element of the array detector generating a signal, responsive to a part of the reflected radiation reaching the apparatus, the magnitude of particular element's signal being dependent on the distance of a point in the scene, associated with that element's signal; and a processor which forms an image, having an intensity value distribution indicative of the distance of each of the points in the scene from the apparatus, based on the magnitude of the signal associated with the point;

wherein the first and second modulation functions comprise repetitive pulsed modulation functions which are different from each other.

21 Claims, 3 Drawing Sheets

U.S. PATENT DOCUMENTS

| | | |
|---|---|---|
| 4,143,263 | 3/1979 | Eichweber . |
| 4,477,184 | 10/1984 | Endo . |
| 4,687,326 | 8/1987 | Corby, Jr. . |
| 4,734,733 | 3/1988 | Clapp et al. . |
| 4,769,700 | 9/1988 | Pryor . |
| 4,780,732 | 10/1988 | Abramov . |
| 4,935,616 | 6/1990 | Scott . |
| 4,959,726 | 9/1990 | Miida et al. . |
| 4,971,413 | 11/1990 | Inoue . |
| 5,009,502 | 4/1991 | Shih et al. . |
| 5,056,914 | 10/1991 | Kollodge . |
| 5,081,530 | 1/1992 | Medina . |
| 5,090,803 | 2/1992 | Ames et al. . |
| 5,110,203 | 5/1992 | MacCabee . |
| 5,157,451 | 10/1992 | Taboada et al. . |
| 5,198,877 | 3/1993 | Schulz . |
| 5,200,793 | 4/1993 | Ulich et al. . |
| 5,200,931 | 4/1993 | Kosalos et al. . |
| 5,216,259 | 6/1993 | Stern et al. . |
| 5,220,164 | 6/1993 | Lieber et al. . |
| 5,225,882 | 7/1993 | Hosokawa et al. . |
| 5,243,553 | 9/1993 | Flockencier . |
| 5,253,033 | 10/1993 | Lipchak et al. . |
| 5,255,087 | 10/1993 | Nakamura et al. . |
| 5,265,327 | 11/1993 | Faris et al. . |
| 5,334,848 | 8/1994 | Grimm . |
| 5,343,391 | 8/1994 | Mushabac . |
| 5,351,677 | 10/1994 | Kami et al. . |
| 5,408,263 | 4/1995 | Kikuchi et al. . |
| 5,434,612 | 7/1995 | Nettleton et al. |

OTHER PUBLICATIONS

Delong et al; Underwater Laser Imaging System;Proceedings of the Autonomous Vehicles in Mine Countermeasures Symposium, pp. 6–103 through 6–111; Apr., 1995.

Sackos et al.; The Emerging Versatillity of Scannerless Range Imager; SPIE, vol. 2748; pp. 47–60; Conference date Apr. 10, 1996; Abstract in 1995.

Burns et al; Compact, 625–Channel Scannerless imaging Laser Radar Receiver; SPIE vol. 2748, pp39–46 Conference date Apr. 10, 1996; Abstract in 1995. .

THREE DIMENSIONAL CAMERA

FIELD AND BACKGROUND OF THE INVENTION

The present invention relates to three-dimensional cameras and, more particularly, to systems for accurately determining the distance to various objects and portions of objects in the scene.

Various techniques are known for creating a three-dimensional image of a scene, i.e., a two-dimensional image which, in addition to indicating the lateral extent of objects in the scene, further indicates the relative or absolute distance of the objects, or portions thereof, from some reference point, such as the location of the camera.

At least three basic techniques are commonly used to create such images. In one technique, a laser or similar source of radiation is used to send a pulse to a particular point in the scene. The reflected pulse is detected and the time of flight of the pulse, divided by two, is used to estimate the distance of the point. To obtain the distance of various points in the scene, the source is made to scan the scene, sending a series of pulses to successive points of the scene.

In a similar technique, a phase shift, rather than time of flight, is measured and used to estimate distances. Here, too, the entire scene or relevant portions thereof must be scanned one point at a time.

In a third technique, which also involves scanning, at least a single radiation source and corresponding detector are used, with suitable optics which act on the light in a manner which depends on the distance to the object being examined, to determine the distance to a particular point in the scene using a triangulation technique.

The major disadvantage of all three of the above-described techniques is that each requires point by point scanning to determine the distance of the various objects in the scene. Such a scanning significantly increases the frame time of the system, requires expensive scanning equipment and necessitates the use of fast and powerful computational means.

There is thus a widely recognized need for, and it would be highly advantageous to have, a method and system for rapidly and easily determining the distance of various points in a scene without the need for scanning and complex computational capabilities.

SUMMARY OF THE INVENTION

According to the present invention there is provided a system and method for creating an image indicating distances to various objects in a scene. The system includes: (a) a source of radiation for directing source radiation at the scene; (b) a detector for detecting the intensity of radiation reflected from the objects in the scene; (c) a source modulator for modulating the source of radiation; (d) a detector modulator for modulating the detector; (e) a source modulator control mechanism for controlling the source modulator; and (f) a detector modulator control mechanism for controlling the detector modulator.

According to a preferred embodiment of the present invention, the source modulator control mechanism and the detector modulator control mechanism operate to simultaneously control the source modulator and the detector modulator.

According to further features in preferred embodiments of the invention described below, the modulator of the source radiation and the modulator of the reflected radiation serve to alternately block and unblock or alternately activate and deactivate the source radiation and detector, respectively.

According to still further features in the described preferred embodiments the source of radiation is a source of visible light, such as a laser and the detector includes photographic film, or a video camera sensor, such as a Charge Coupled Device (CCD.).

According to yet further features, the method further includes processing the intensity of radiation reflected from the objects in the scene to determine distances of the objects and, in a most preferred embodiment, comparing the intensities detected during a relatively continuous irradiation and detector period with intensities detected during modulation of the source and the detector.

Also according to the present invention there is provided a method for creating an image indicating distances to various objects in a scene, comprising the steps of: (a) directing source radiation at the scene using a radiation source; (b) detecting intensity of radiation reflected from the objects in the scene using a detector; (c) modulating the radiation source using a radiation source modulator; (d) modulating the detector using a detector modulator; and (e) controlling the radiation source modulator; and (f) controlling the detector modulator.

According to further features the method further includes processing the intensity of the radiation reflected from the objects in the scene to determine distances of the objects.

In a preferred embodiment, the processing includes comparison of intensities detected during a relatively continuous irradiation and detector period with intensities detected during modulation of the source and the detector.

The present invention successfully addresses the shortcomings of the presently known configurations by providing a system and method for quickly and readily determining distances to portions of a scene without the need for expensive and time consuming scanning of the scene.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a system and method which can be used to determine the distance of various portions of a scene.

The principles and operation of a system and method according to the present invention may be better understood with reference to the drawings and the accompanying description.

Figure 1:
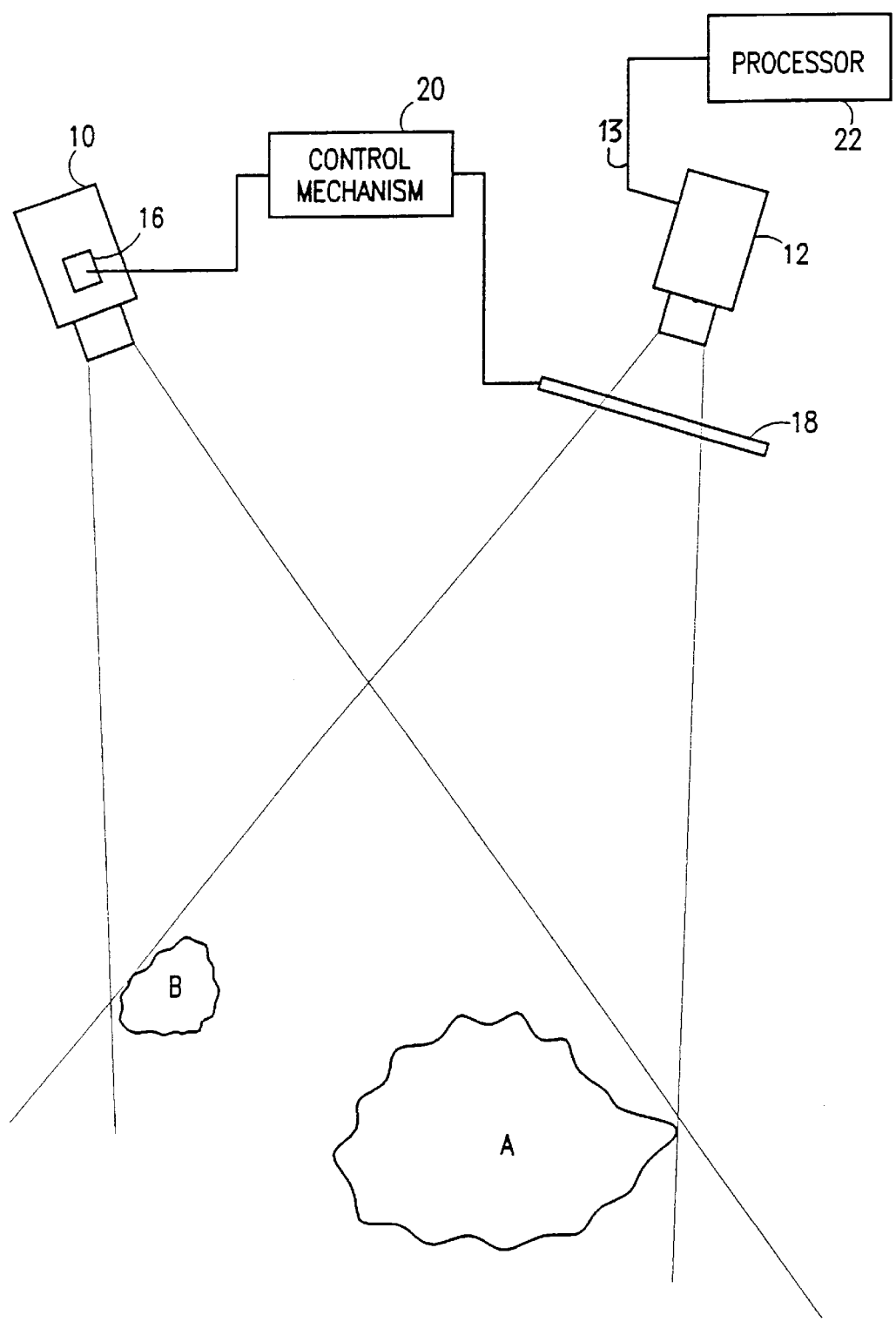
FIG. 1 shows a typical set up of a system and method according to the present invention.

Referring now to the drawings, FIG. 1 illustrates a typical setup of a system according to the present invention.

A system according to the present invention includes a source of radiation 10 for directing radiation at the scene being observed. In the case of FIG. 1, and for purposes of illustration, the scene depicted includes two three-dimensional objects denoted 'A' and 'B'. The radiation used may be any suitable radiation having a suitable wavelength for the distances examined and other suitable properties as will become more clear from the subsequent discussion. For most applications the radiation is visible or infrared radiation, such as laser radiation or stroboscopic light.

The system further includes a detector 12 for detecting the intensity of radiation reflected from the objects in the scene. The detected radiation is that portion of the source radiation which impinges upon the objects of the scene and which is reflected back toward detector 12. The location of detector 12 may be any suitable location, for example, as shown in FIG. 1. Detector 12 may also be located closer to, or even substantially coincident with, radiation source 10, if desired. The detector used may be any suitable detector with a suitable resolution and suitable number of gray levels including, but not limited to, a photographic film camera and a video camera, such as a CCD camera.

The system includes a radiation source modulator, depicted schematically as item 16, for modulating radiation source 10 or the source radiation and a detector modulator 18 for modulating the reflected radiation which is headed for detector 12 or detector 12 itself. The word 'modulate' as used herein is intended to include any varying of the level of operation or any operating parameters of radiation source 10 or of the source radiation itself and/or of detector 12 or of the reflected radiation itself, as appropriate, including, but not limited to, the alternate blocking and unblocking and the alternate activating and deactivating of radiation source 10 or the source radiation and detector 12 or the reflected radiation.

Various mechanisms may be used to modulate radiation source 10 or the source radiation and detector 12 or the reflected radiation. For example, the source radiation and/or reflected radiation may be physically blocked periodically using a suitable shutter or similar element. For example, a shutter 18 is depicted in FIG. 1 at the entrance of detector 12. The shutter may be in any suitable form, for example, in the form of a rotating disk with an opening such that reflected light can pass through to detector 12 whenever the opening and detector 12 are aligned but is blocked at other times during the rotation of the disk.

Other mechanisms which may be used to modulate radiation source 10 and/or detector 12 include various high frequency electronic modulation means for periodically deactivating radiation source 10 and/or detector 12, including, but not limited to, RF modulators. Depicted in FIG. 1 is a source modulator 16 which is shown as being internal to radiation source 10 and which is intended to convey the concept of electronically activating and deactivating radiation source 10. Similar principles apply for detector 12. In addition, various electro optical modulator may be used. These include KDP, lithium niobate and liquid crystals.

It is to be noted that whenever reference is made in the specification and claims to a radiation source modulator or to the modulation of the radiation source it is to be understood as involving the modulation of the radiation source itself and/or of the source radiation. Similarly, whenever reference is made in the specification and claims to a detector modulator or to the modulation of the detector it is to be understood as involving the modulation of the detector itself and/or of the reflected radiation.

Finally, a system according to the present invention includes mechanisms for controlling source modulator 16 and detector modulator 18. Preferably, the mechanisms for controlling source modulator 16 and detector modulator 18 operate together in a coordinated manner, or, most preferably, are the same mechanism 20, so as to simultaneously control source modulator 16 and detector modulator 18. The simultaneous control may be synchronous so that the operation of both radiation source 10 and detector 12 is affected in the same way at the same time, i.e., synchronously. However, the simultaneous control is not limited to such synchronous control and a wide variety of other controls are possible. For example, and without in any way limiting the scope of the present invention, in the case of blocking and unblocking control, radiation source 10 and detector 12 may be open for different durations during each cycle and/or the unblocking of detector 12 may lag the unblocking of radiation source 10 during each cycle.

A system according to the present invention further includes a suitable processor 22 which analyzes the intensity of radiation detected by detector 12 and determines the distances to various objects and portions of objects in the scene being examined. The operation of processor 22 is explained in more detail below.

Figure 2:
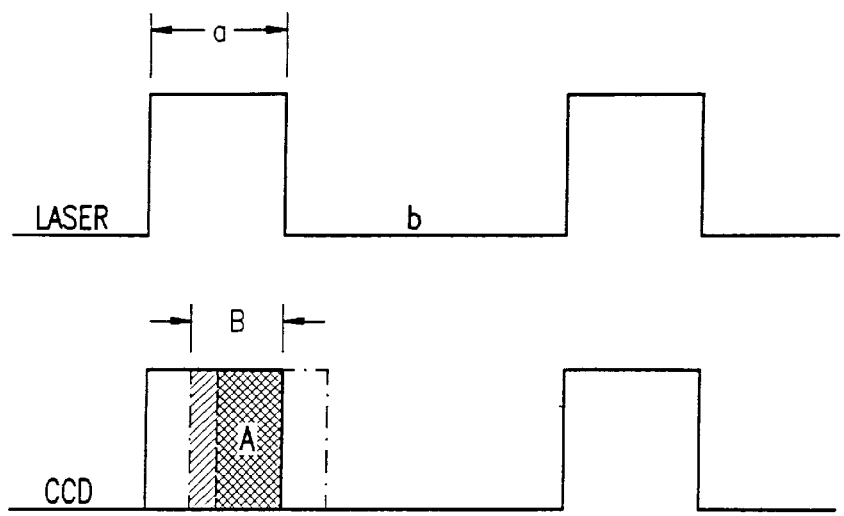
FIG. 2 shows a typical modulation scheme which might be employed in a system and method of the present invention.

In operation, a typical system according to the present invention, using a laser as the radiation source, a CCD sensor as the detector and modulating the source and detector by synchronous switching, would operate as follows. Laser 10 and CCD 12 are activated (or unblocked) and deactivated (or blocked) periodically in a synchronous manner, as depicted in FIG. 2 which shows a type of square wave modulation. Thus during each cycle, both laser 10 and detector 12 are active for a time 'a' and are inactive for a time 'b'. The times 'a' and 'b' may be the same or different. The wavelength of laser 10 and the time 'a' are selected so that light from laser 10 will be able to travel to the most distant objects of interest in the scene and be reflected back to CCD 12.

The selection of the time 'a' can be illustrated with a simple example. Let us assume that the scene to be examined is as in FIG. 1 with the maximum distance to be investigated being approximately 50 meters from the source or detector, i.e., both objects A and B are within about 50 meters from the detector and source. Light traveling from the source to the farthest object and back to the detector would take approximately 0.33 $\mu$sec to travel the 100 meters. Thus, the time duration 'a' should be approximately 0.33 $\mu$sec.

Systems and methods according to the present invention are based on the idea that a near object will reflect light to the detector for a longer period of time during each cycle than a far object. The difference in duration of the detected reflected light during each cycle will translate to a different intensity, or gray level, on the detector. Thus, for example, if we assume that a certain point on object B is a certain number of meters away from the source and/or detector while a certain point on object A is a greater distance away, then reflected light from the point on B will start arriving at the detector relatively early in the active portion of the detector cycle (see FIG. 2) and will continue to be received by the detector until the detector is deactivated at the end of the active portion of the detector cycle. The reflected light from the point on B will continue to proceed toward the detector for a period 'a' which corresponds to the period of irradiation (see the dot-dash-dot line in FIG. 2). However, the portion of this reflected radiation which falls beyond the deactivation or blocking of the detector will not be received by the detector and will not contribute toward the intensity sensed by the corresponding pixels of the detector.

By contrast, light reflected from the point on object A will start arriving at the detector later during the active portion of the detector cycle and will also continue to be received by the detector until the detector is deactivated.

The result is that reflected light from a point on object B will have been received for a longer period of time than reflected light from a point on object A (see the shaded areas in FIG. 2). The detector is such that the intensity of gray level of each pixel during each cycle is related to the amount of time in each cycle during which radiation was received by that pixel. Hence, the intensity, or gray level, can be translated to the distance, relative or absolute, of the point on the object.

Figure 3:
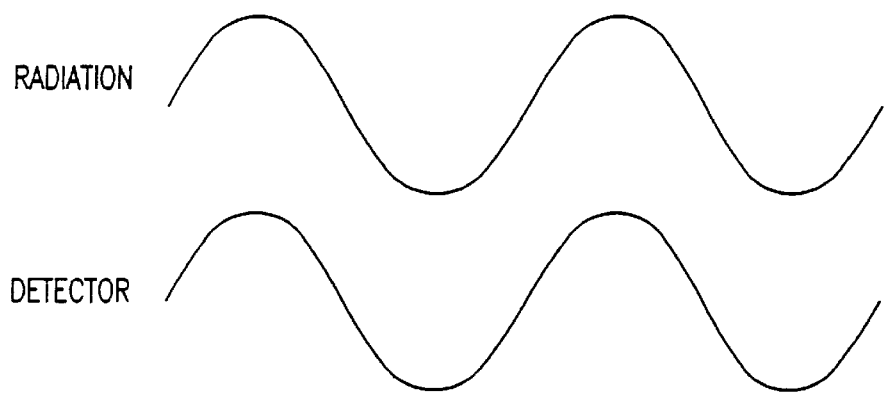
FIG. 3 shows another modulation scheme which might be employed.

As stated above, the synchronous on/off operation described in the example and depicted in FIG. 2, is not the only possible mode of operation. Other modulations may be used. For example, the radiation source and/or detector may be modulated harmonically as shown in FIG. 3.

To avoid obtaining false signals from distant objects which are beyond the region of interest, it may be desirable to increase the time duration 'b' during which the source/detector are inactive so that the bulk of the reflected radiation from faraway objects which are of no interest reaches the detector when the detector is deactivated and therefore do not contribute to the intensity detected by the corresponding pixel of the detector. A proper choice of the duration 'b' thus can be used to ensure that only reflected radiation from objects within the desired examination range are received during each specific cycle, thereby facilitating the interpretation of the intensity image.

As will readily be appreciated, in certain applications, different portions of the various objects in the scene may have different reflectivities. The different reflectivities result from different colors, textures, and angles of the various portions of the objects. Thus, two points which are the same distance from the source/detector will be detected as having different intensities which could lead to false distance readings which are based on intensities, as described above.

It is possible to readily compensate for differences in reflectivities of different objects or portions of objects being examined. As is well known, the intensity detected by a pixel of a detector receiving continuous radiation from a specific portion of a scene is directly proportional to the reflectivity of the portion being viewed and inversely proportional to the square of the distance between the portion of the scene being viewed and the detector.

It can readily be shown that when a pulsed radiation source, such as those described above, is used the intensity detected by a pixel of a detector receiving radiation from a specific portion of a scene is still directly proportional to the reflectivity of the portion of the scene being viewed but is inversely proportional to the distance between the portion of the scene being viewed and the detector raised to the third power.

Figure 4:
FIG. 4 illustrates yet another modulation scheme which can be used to enhance the accuracy of a system and method according to the present invention 1.
Figure 5A:
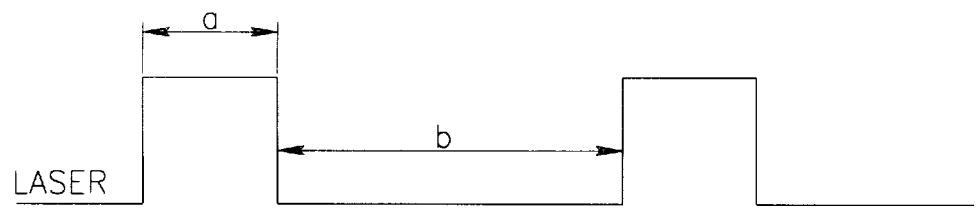
FIGS. 5A and 5B respectively, show source and detector modulation signals that are shifted and that have different durations.
Figure 5A:
Figure 5B:
Figure 5B:

Thus, to compensate for the effects of different reflectivities, one can use both continuous radiation and pulsed radiation. An example of such a cycle is shown in FIG. 4. Here the radiation source and detector are active for a relatively long period of time to provide the continuous intensity of the objects in the scene. Periodically, the source and detector are deactivated and the source and detector are pulsed, in the same way as described above with reference to the basic embodiment, using one or more, preferably a train, of pulses.

The detection during the pulsing portion of the cycle is used as described above. However, in addition, the continuous detection during the long active period of the cycle is used to correct, or normalize, the distances and compensate for differences in reflectivities. The compensation can be accomplished by any convenient method, for example, by dividing the intensity of each pixel during the continuous period by the intensity of the same pixel during the pulsed period, with the quotient between the two being directly proportional to the distance of the region being viewed by the pixel.

While the invention has been described with respect to a limited number of embodiments, it will be appreciated than many variations, modifications and other applications of the invention may be made.

We claim:

1. Apparatus for creating an image indicating distances to points in objects in a scene, comprising:
   a modulated source of radiation, having a first modulation function, which directs radiation toward a scene such that a portion of the modulated radiation is reflected from the points and reaches the apparatus;
   an array detector which detects radiation from the scene, modulated by a second modulation function, each element of the array detector being associated with a point in the scene, each element of the array detector generating a signal, responsive to a part of the portion of the reflected radiation reaching the apparatus, the magnitude of particular element's signal being dependent on the distance of a point in the scene, associated with that element's signal; and
   a processor which forms an image, having an intensity value distribution indicative of the distance of each of the points in the scene from the apparatus, based on the magnitude of the signal associated with the point;
   wherein the first and second modulation functions comprise repetitive pulsed modulation functions which are different from each other.

2. Apparatus according to claim 1 wherein the modulated source of radiation comprises:
   a source of radiation; and
   a source modulator which receives radiation from the source of radiation, modulates it, and directs the modulated radiation toward the scene.

3. Apparatus according to claim 2 wherein the source modulator comprises an electro optic modulator.

4. Apparatus according to claim 2 wherein the source modulator comprises a KDP modulator.

5. Apparatus according to claim 2 wherein the source modulator comprises an LCD shutter.

6. Apparatus according to claim 1 wherein the detector comprises means for periodically activating and deactivating the detector in accordance with the second modulation function.

7. Apparatus according to claim 1 wherein the detector comprises:
   a detector module which receives radiation reflected from the scene and modulates it in accordance with the second modulation function.

8. Apparatus according to claim 7 wherein the detector modulator comprises a KDP modulator.

9. Apparatus according to claim 7 wherein the detector modulator comprises an LCD shutter.

10. Apparatus according to claim 7 wherein the detector modulator comprises an electro-optic modulator.

11. Apparatus according to any of claims 1–10 wherein the first and second modulation functions are time shifted with respect to each other.

12. Apparatus according to any of claims 1–10 wherein the first and second modulation functions have different forms.

13. Apparatus according to claim 1 or claim 6 wherein the first and second modulation functions provide relatively high transmission during a first period, and relatively low transmission during a second sequential period, and wherein the duration of the first and second periods is different for at least one of the first and second modulation functions.

14. Apparatus according to claim 13 wherein during the respective second sequential periods, substantially all the radiation is blocked.

15. Apparatus according to any of claims 1–10 wherein at least portions of said detector and said processor are comprised in a photographic film.

16. Apparatus for creating an image indicating distances to objects in a scene, comprising:

a modulated source of radiation which directs radiation toward a scene such that a portion of the radiation from the source is from points in the scene and reaches the apparatus;

a detector comprising a photographic film; and a modulator which receives said portion, modulates it, and transmits a part of the portion of the radiation to the detector, said part being dependent on the distance of respective in the scene from the apparatus;

forms an image having an intensity distribution indicative of the distance of objects from the apparatus on the photographic film.

17. Apparatus according to any of claims 1–10 wherein the image is a non-holographic image.

18. Apparatus according to any of claims 1–10 wherein the detector comprises a CCD camera which receives reflected radiation and produces said signals a frame at a time, each said signal comprising the response of an element of the CCD array to a plurality of pulses of radiation.

19. A method of determining the distance to portions of a scene comprising:

illuminating the scene with a plurality of consecutive mutually identical pulses of energy such that energy from the portion is received at a detector, said pulses occurring during a plurality of spaced first time periods;

determining the part of the received energy which is within a plurality of mutually identical, spaced, consecutive second time periods; and ascertaining the distance to the portion of the scene based on the value of the determined part, wherein the plurality of mutually identical first time periods and the plurality of mutually identical second time periods are not identical to each other.

20. A method according to claim 19 wherein the plurality of first and second time periods are not identical in that they are time shifted with respect to each other.

21. A method according to claim 19 or claim 20 wherein the first time periods are separated by a plurality of third time periods and wherein the second time periods are separated by a plurality of fourth time periods and wherein the first and second time periods are different in length from the third and fourth time periods respectively.

* * * * *